US007393480B2

(12) United States Patent
von Haas

(10) Patent No.: US 7,393,480 B2
(45) Date of Patent: Jul. 1, 2008

(54) METHOD AND APPARATUS FOR THE MANUFACTURE OF CHIP BOARDS AND FIBER BOARDS

(75) Inventor: Gernot von Haas, Leimen (DE)

(73) Assignee: Dieffenbacher GmbH +Co. KG, Eppigen (DE)

( * ) Notice: Subject to any disclaimer, the term of this patent is extended or adjusted under 35 U.S.C. 154(b) by 62 days.

(21) Appl. No.: 10/047,984

(22) Filed: Jan. 17, 2002

(65) Prior Publication Data

US 2002/0140121 A1 Oct. 3, 2002

(30) Foreign Application Priority Data

Jan. 17, 2001 (DE) ................................ 101 01 952

(51) Int. Cl.
*B29C 45/76* (2006.01)

(52) U.S. Cl. .................... 264/40.5; 264/40.1; 264/40.6; 264/109; 264/119

(58) Field of Classification Search ................ 264/40.1, 264/40.5; 100/118, 151
See application file for complete search history.

(56) References Cited

U.S. PATENT DOCUMENTS

| | | | | |
|---|---|---|---|---|
| 3,776,538 | A * | 12/1973 | Beck, Jr. | 269/46 |
| 3,915,075 | A * | 10/1975 | Luke et al. | 493/39 |
| 4,341,260 | A * | 7/1982 | Ishibachi et al. | 164/463 |
| 4,933,125 | A * | 6/1990 | Reiniger | 264/29.4 |
| 5,093,051 | A * | 3/1992 | Reiniger | 264/29.4 |
| 5,160,411 | A * | 11/1992 | Bold | 162/398 |
| 5,458,477 | A * | 10/1995 | Kemerer et al. | 425/371 |
| 5,538,676 | A | 7/1996 | Bielfeldt | |
| 5,762,980 | A * | 6/1998 | Bielfeldt | 425/371 |
| 6,004,320 | A | 12/1999 | Froese et al. | |
| 6,652,695 | B1 * | 11/2003 | Von Der Heide et al. | 156/182 |

FOREIGN PATENT DOCUMENTS

| | | | |
|---|---|---|---|
| DE | 43 33 614 A1 | 4/1995 | |
| DE | 197 04 643 A1 | 8/1998 | |

OTHER PUBLICATIONS

"http://www.engineersedge.com/properties_of_metals" accessed Feb. 18, 2005.*

"http://www.mellesgriot.com/products/optomechanicalhardware/ch18-00.asp" accessed Feb. 20, 2005.*

Listing of Typical Thermal Conductivities for various materials.*

Beitz et al., "Taschenbuch für den Maschinenbau," Dubbel, pp. E117.

* cited by examiner

*Primary Examiner*—Monica A Huson
(74) *Attorney, Agent, or Firm*—Foley & Lardner LLP

(57) ABSTRACT

A continuously operating press for the continuous manufacture of wood material boards having a textured surface on at least one side includes: an upper frame part and a lower frame part; two endless steel belts configured to draw a mat of material through the continuously operating press and to transfer press pressure, each steel belt associated with one of the upper frame part and the lower frame part; an endless metal mesh belt associated with a corresponding one of the steel belts; an insulating tunnel associated with the metal mesh belt and the corresponding steel belt; and a heating tunnel associated with the metal mesh belt and separated from the corresponding steel belt. The metal mesh belt includes a material having a thermal conductivity substantially higher than that of the corresponding steel belt and having a thermal expansion coefficient approximately equal to that of the corresponding steel belt.

52 Claims, 1 Drawing Sheet

METHOD AND APPARATUS FOR THE MANUFACTURE OF CHIP BOARDS AND FIBER BOARDS

The present application claims priority to DE 1 01 01 952.1, filed in Germany on Jan. 17, 2001, which is hereby incorporated by reference.

FIELD OF THE INVENTION

The invention relates to a method for the manufacture of chip board and fiber boards, or wood material boards to be pressed from long shavings.

BACKGROUND OF THE INVENTION

One such apparatus is disclosed in DE 43 33 614 A1. This apparatus consists of a spreading station, steam moistening apparatus, preheating section, and a continuously operating press, these four apparatuses being joined together in a continuously running and circulating manner by an endless woven metal belt having in each of its two marginal areas a heat-resistant plastic composition, for example Teflon.

The problem that was presented was that the press factor, especially in the processing of long shavings spread with orientation (resulting in OSB boards), is substantially greater than in the production of chip board. In addition to the negative influence of the coarse chip structure the poor press factor was due to the following: the processing of pressed boards of wood material, such as chip board, MDF (medium density fiber board), or OSB boards is performed technologically according to the principles that the wood particles—in this case the large-area oriented shavings for the OSB boards—are wetted with a moist fluid resin content (for example, phenolic resin binders), and that this water is evaporated when the chip mat in the press is heated, and the formation of steam, especially in the core of the boards being manufactured, produces a surrounding field of heat that is equal to or greater than 100° C. Since in the normal production of chip boards or MDF boards, the chip mat is enclosed between smooth press surfaces (hot plates or steel belts), a pressure higher than 1 bar can form between the large-area press zones. According to the steam pressure diagram, the temperature then rises with the rising steam pressure. In general, a temperature level of about 120° C. establishes itself between the upper and lower press surfaces. Due to the steam pressures in excess of 1 bar, an accelerated transfer of steam occurs from the outer layers to the middle layers, which results in an accelerated curing, especially in the core of the boards. This elevated steam pressure cannot establish itself through the metal mesh belt, because the mesh belt does not permit any build-up of pressure, so that only a wet steam is formed in the range around about 100° C., so that an accelerated curing in the core of the board is not possible. Ultimately, this results in the press factors that are approximately twice as high than in any normal production of chip boards.

For the reasons set forth, the production of OSB boards was economical only on a multiple-day apparatus with a very great number of stages. For the same reason, the use of continuously operating presses has hardly established itself in the production of OSB, because due to the high press factor, excessively long presses would have to be used, which would require an excessively high capital investment in proportion to productivity. On the other hand, however, the manufactured homes industry requires OSB boards in which at least one side displays a surface texture in the form of a mesh belt impression made by a metal wire mesh. The metal wire mesh serves in multi-stage presses for the transport of the coarse wood chips which are spread onto the metal wire mesh belt, and which cannot be pre-compressed in a fore-press. On the other hand, it provides for the surface texture on the pressed OSB boards which is functionally necessary for further processing.

With the method and apparatus according to DE 43 33 614 A1 it has been possible to improve the press factor to such an extent that an economical manufacture of chip boards can be achieved in a continuously operating press from a chip mat with large-area, oriented long shavings.

In the implementation of the invention according to DE 43 33 614 A1, it has developed that the method and the apparatus are suitable for the production of OSB in fast pressing time. The method and the apparatus, however, are capable of improvement, namely in regard to reducing the press time, the quality of the surface texture created, and the quality of the board.

An apparatus has furthermore been disclosed in DE 197 04 643 C2 in which, in the continuously operating press for the manufacture of primarily OSB boards, a circulating mesh belt is also carried through the press. In this apparatus the attempt has been made to prevent thermal expansions and differential expansions from resulting in damage to the steel belt and/or the mesh belt. The invention attempts to prevent damage by using a mesh belt and steel belt made of materials with equal thermal expansion properties, and by various measures to equalize their temperatures before they run into the continuously operating press. Thus relative movements between the steel belt and mesh belt are said to be prevented. But the steel belt and mesh belt have a very low thermal conductivity since they are made of high-alloy stainless steel. It has turned out that equipment of this kind has a production rating about 5% lower if the steel and metal mesh belts consist of high-alloy steels. The problem is that the heat has to be carried over the heating plates, through the steel belt and through the metal mesh belt to the surface of the material being pressed. The heat flow is hampered by the low thermal conductivity of the metal mesh belt. This reduced heat flow results in a slower heating of the material mat, especially in the center of the mat, within the continuously operating press, and thus results in longer press time and slower steel belt running and production rates.

SUMMARY OF THE INVENTION

The present invention is addressed to the problem of improving the quality of the texture of the manufactured boards of wood material, especially OSB boards, and achieving a longer life of the texturing metal mesh belt. The invention further makes it possible to adjust the process parameters for the wood material board between the textured side and the smooth side of the board to improve the production rate and product quality in regard to flexural strength and raw density profile, and to reliably assure the manufacture of a textured surface.

The present invention solves this and other problems. The present invention provides for a method for the continuous manufacture of wood material boards having a textured surface on at least one side, comprising: forming a mat of a wood or lignocellulose-containing material, treated with a binding agent, onto a continuously moving conveyor belt; introducing the mat between steel belts each circulating around one of an upper and lower frame part of a continuously operating press; and, after the step of introducing the mat, curing the mat in the continuously operating press to form one of a strand of boards and an endless wood material board by applying pressure and heat to the mat, wherein the continuously operating press comprises at least one endless metal mesh belt configured to circulate with a corresponding one of said steel belts and with the mat, wherein the metal mesh belt comprises a material having a thermal conductivity substantially higher than that of the corresponding steel belt and having a thermal expansion coefficient approximately equal to that of the corresponding steel belt, wherein the metal mesh belt and the corresponding steel belt are configured to pass through an insulating tunnel, in a return run, to reduce heat loss by thermal radiation, wherein the metal mesh belt is configured to pass through a heating tunnel, which is separated from the corresponding steel belt, wherein the heating tunnel is configured to heat the metal mesh belt to a temperature that is higher than a temperature of the corresponding steel belt by at least 40° C., and wherein curing the mat comprises applying a specific pressure to the mat of at least 0.3 $N/mm^2$ during a first at least 80% of a pressing time.

In one aspect of the present invention, the method further comprises the step of measuring a density profile of the formed one of the strand of boards and the endless wood material board, after the step of curing the mat, wherein the heating tunnel is configured to heat the metal mesh belt to a temperature profile that directly depends on said density profile.

In another aspect of the present invention, the method further comprises the step of adjusting a symmetrical or asymmetrical raw density profile in the formed one of the strand of boards and the endless wood material board, by adjusting a heat input into the side of the mat which is to be textured.

In another aspect of the present invention, the heating tunnel is configured to heat the metal mesh belt to a temperature that is higher than the temperature of the corresponding steel belt by at least 80° C.

In another aspect of the present invention, the step of introducing the mat comprises introducing the mat with a moisture content of less than or equal to approximately 9 weight-percent.

In another aspect of the present invention, the method further comprises the step of spraying one or both face strata of the mat with water.

In another aspect of the present invention, the method further comprises the step of preheating one or both face strata of the mat with steam.

The present invention also provides for a continuously operating press for the continuous manufacture of wood material boards having a textured surface on at least one side, comprising: an upper frame part and a lower frame part; two endless steel belts configured to draw a mat of material through the continuously operating press and to transfer press pressure, each steel belt associated with one of the upper frame part and the lower frame part; an endless metal mesh belt associated with a corresponding one of said steel belts; an insulating tunnel associated with said metal mesh belt and said corresponding steel belt; and a heating tunnel associated with said metal mesh belt and separated from said corresponding steel belt, wherein the metal mesh belt comprises a material having a thermal conductivity substantially higher than that of the corresponding steel belt and having a thermal expansion coefficient approximately equal to that of the corresponding steel belt, wherein the metal mesh belt and the corresponding steel belt are configured to pass through the insulating tunnel, in a return run, to reduce heat loss by thermal radiation, wherein the metal mesh belt is configured to pass through the heating tunnel, and wherein the heating tunnel is configured to heat the metal mesh belt to a temperature that is higher than a temperature of said corresponding steel belt by at least 40° C.

In one aspect of the present invention, the continuously operating press is configured to apply a specific pressure to the mat of at least 0.3 $N/mm^2$ during a first at least 80% of a pressing time.

The present invention also provides for an apparatus for the continuous manufacture of wood material boards having a textured surface on at least one side, comprising: a spreading station configured to spread an unoriented or oriented mixture of binding agent and one of chips and shavings to form a mat of material; a continuously operating press; and a conveyor belt configured to continuously move under the spreading station and configured to transfer the mat of material to the continuously operating press, wherein the continuously operating press comprises: an upper frame part and a lower frame part; a heatable and coolable press platen mounted on each of the upper frame part and the lower frame part; two endless steel belts configured to draw the mat of material through the continuously operating press and to transfer press pressure, each steel belt associated with one of the upper frame part and the lower frame part; driving and idler drums configured to support and carry said steel belts; an endless metal mesh belt associated with a corresponding one of said steel belts; an insulating tunnel associated with said metal mesh belt and said corresponding steel belt; and a heating tunnel associated with said metal mesh belt and separated from said corresponding steel belt, wherein the metal mesh belt comprises a material having a thermal conductivity substantially higher than that of the corresponding steel belt and having a thermal expansion coefficient approximately equal to that of the corresponding steel belt, wherein the metal mesh belt and the corresponding steel belt are configured to pass through the insulating tunnel, in a return run, to reduce heat loss by thermal radiation, wherein the metal mesh belt is configured to pass through the heating tunnel, wherein the heating tunnel is configured to heat the metal mesh belt to a temperature that is higher than a temperature of said corresponding steel belt by at least 40° C., and wherein the continuously operating press is configured to apply a specific pressure to the mat of at least 0.3 $N/mm^2$ during a first at least 80% of a pressing time.

In another aspect of the present invention, the heating tunnel comprises exactly one or two heating plates, or exactly one heating roll.

In another aspect of the present invention the metal mesh belt comprises a warp and filling, and wherein the warp and filling each consist of cast steel, or the warp consists of stainless steel and the filling consists of cast steel.

In another aspect of the present invention, the apparatus further comprises a cleaning brush with a blower tube and a vacuum cleaner, configured to continuously clean the metal mesh belt.

BRIEF DESCRIPTION OF THE DRAWING

The drawing shows a schematic view of a preferred embodiment of the present invention.

DETAILED DESCRIPTION

Figure 1:
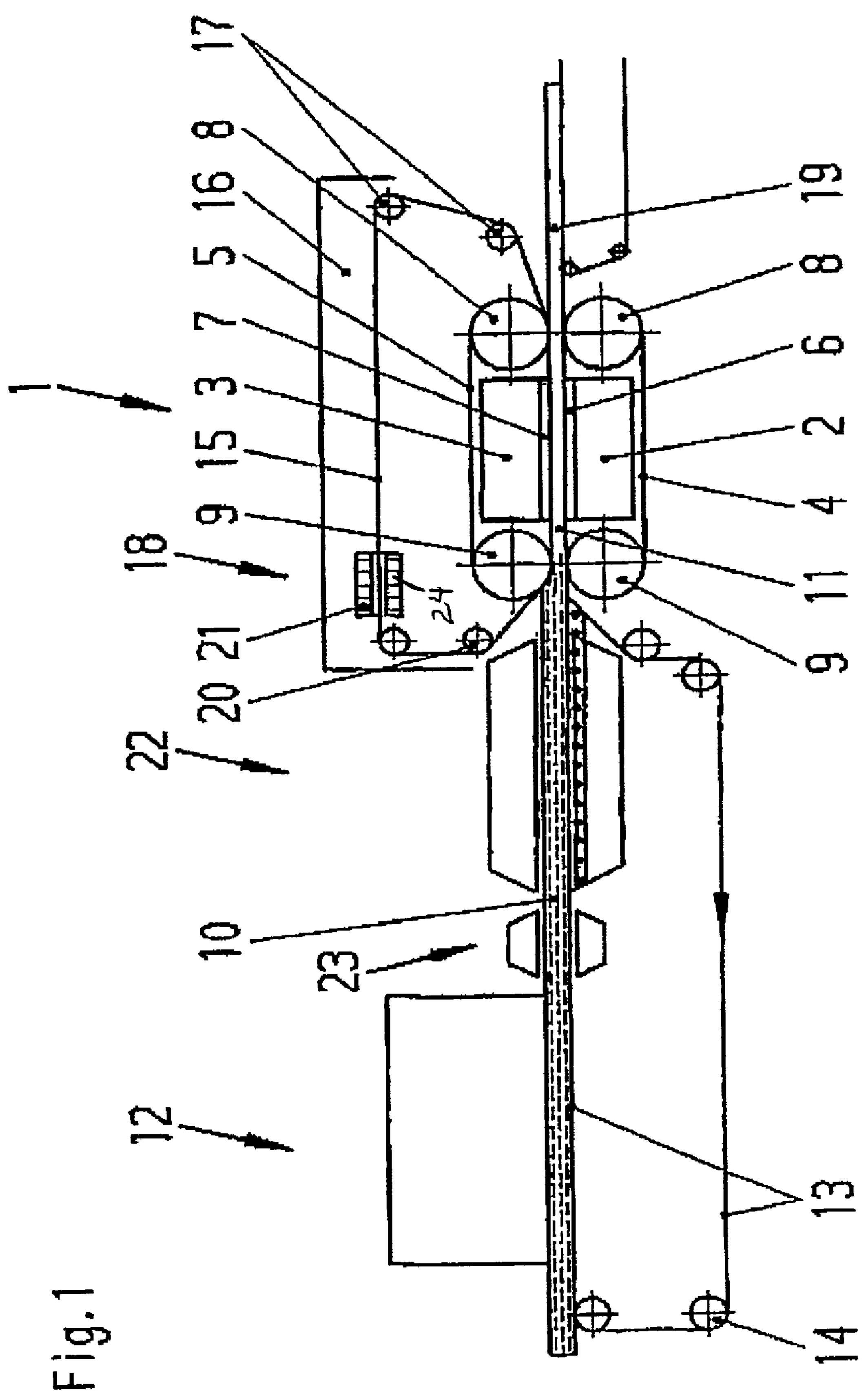

Referring to the drawing, the mat 10 of material to be pressed, composed of oriented or unoriented long shavings or chips, is spread onto a conveyor belt 13 at the spreading station 12. The conveyor belt 13 serves to carry the mat 10 through a sprayer 23 and a preheating apparatus 22 into the continuously operating press 1. The endless conveyor belt 13 is carried over guide pulleys 14. The continuously operating press 1 can be a so-called double belt press, the main parts of which consist of a movable upper frame part 3 and a fixed bottom frame part 2 forming the adjustable press gap 11. Upper frame part 3 and bottom frame part 2 are driven by driving drums 8 and idler drums 9 with steel belts 4 and 5. On the sides of upper frame part 3 and bottom frame part 2 facing the press gap lithe heated and cooled press platens 6 and 7 are mounted. The finished wood material board exiting from the continuously operating press 1 is identified at 19.

According to a preferred embodiment of the present invention, an accompanying metal mesh belt 15 is associated with at least one of the steel belts 4 or 5 (the upper steel belt 5, as shown in the drawing). The metal mesh belt 15 comprises a material of greater thermal conductivity than the steel belt 4 or 5. The steel belt 4 or 5 and the accompanying metal mesh belt 15 are returned together through an insulating tunnel 16 in order to prevent loss due to thermal radiation and to save energy. The metal mesh belt 15 is heated in a heating tunnel 18, before it enters the press gap 11, to a temperature higher than that of the corresponding steel belt 4 or 5 at the entrance to the press gap 11. In the heating tunnel 18 the metal mesh belt 15 is carried over a lower heating plate 24 with which an upper heating plate 21 may also be associated. The preheating of the metal mesh belt 15 can also be performed by means of a heating roll 20, in which case preferably the last guide pulley 17 ahead of the entrance to the press gap 11 is made to be a heating roll 20. In another embodiment of the present invention, the metal mesh belt 15 may be constantly cleaned by a cleaning brush with an air blast bar and exhaust.

Of special importance is the choice of the material of the metal mesh belt, its higher thermal conductivity, the higher temperature of the metal mesh belt upon entry into the press gap, and the specific press pressure during the first 80% to 90% of the pressing time.

Table 1 shows the thermal conductivity of metal mesh belts of various materials. From this it is seen that the metal mesh belt of high-alloy stainless steel has a very low thermal conductivity. According to the invention, a belt is used as the metal mesh belt which has an at least 70% greater thermal conductivity than the steel belt. That is, a metal mesh belt of cast steel or preferably of a mixture of cast steel and stainless steel is used. In spite of the high thermal conductivity of a metal mesh belt of cast steel or of a mixture of cast steel and stainless steel, in the case of a one-sided texturing on the top or bottom side, the heat flow of the top and bottom side is still slightly different if the metal mesh belt, upon contacting the mat of material, has the same temperature as the steel belt. On the board side, with the metal mesh band about 2 mm thick, the heat flow is somewhat reduced, so that, in addition to the slightly reduced press factor, the density profile of the finished board is affected. Right at the start of the pressing, in the case of a high heat requirement, much heat is transported into the outer layers of the mat of material, so that these layers are softened by the heat and are more greatly compacted by the application of pressure than the cold middle layers. Even in the case of slight temperature differences at the surface of the material mat, a different cover layer density occurs, causing an asymmetrical raw density profile, which is considered undesirable by many users of the boards, since these boards more easily warp, among other things.

Therefore, it is especially advantageous that the metal mesh belt upon contacting the material mat has a temperature at least about 40°-80° C. higher than the steel belt. The heat put into the metal mesh belt then leads to an approximately uniform heat flow on the top and bottom sides of the mat, so that the problems described above are diminished. Density profile meters which are installed directly following the continuously operating press permit a continuous display of the density profile of the board just produced. By means of this density profile meter a precise adjustment of the temperature of the metal mesh belt can be performed. If in the case of an upper circulating metal mesh belt the face layer density is too low, it is possible by increased preheating of the metal mesh belt to increase the face layer density.

TABLE 1

Thermal conductivity and thermal expansion coefficient of metal mesh belts with weaving pattern typical for OSB manufacture

| | Thermal conductivity [W/m° K] | Thermal expansion coefficient [1/K] |
|---|---|---|
| Cast steel mesh | 40 | 11 |
| Stainless steel mesh (high-alloy) | 23-25 | 16 |
| Stainless steel warp, cast steel filling | 32 | 16 or 11, according to direction |
| Sandvik steel 1650 SM | 16 | 11 |

The mat of material is under specific pressure during the pressing and shows a growth in width and, as for the length, at first a growth in length, and then at the end of the pressing a certain shrinkage in length. At the same time the pressed mat as bulk material and also the cured mat or hot board have substantially less stiffness than the metal mesh belt. When the pressed mat is relieved of pressure during processing, a relative movement occurs between the pressed mat and the texturing belt, causing the texture to be blurred.

In the case of the mesh texture of a Flexopan mesh as commonly used in cyclic pressing, the distance between two filling wires is about 1.7 mm. A shift of 0.2 or 0.3 mm between the filling wire and the pressed mat, if the pressure is relieved and is reapplied, or if the specific pressure is too low, would result in a visible loss of texture quality.

In other words, when a certain minimum pressure of 0.3 $N/mm^2$—i.e., a normal force—is applied to the mat, the static friction between the mat and the metal mesh belt is sufficiently great so that no shift takes place between the mat and the metal mesh belt. Tests have shown that this pressure alone suffices to prevent relative movement. Toward the end of the pressing, after about 80% of the pressing time, the specific pressure may be dropped below 0.3 $N/mm^2$ in order to let vapor off from the hot board. After the vapor venting has begun, the specific pressure is no longer increased. So at the end of the pressing the specific pressure may be lowered without impairing the texture quality, because another subsequent application is not performed. A slight relative movement between the steel belt and the metal mesh belt is allowed in the press gap. This results in wear on the metal mesh belt. Relative movement between the metal mesh belt and the heating plate also takes place in a cyclic press in which a metal mesh belt with a temperature under 50° C. is deposited on a pressed board heated at 220° C. At this rate of wear the metal mesh belt has a useful life far in excess of a year.

The raw material mat can be sprayed with hot water or, preferably, the surface layers are preheated with steam by the method of DE 44 47 841; both methods serve to shorten the pressing time. In the continuous production of OSB, often only the top side of the raw mat is sprayed with water, since on the bottom of the mat the spray water remains on the transport belt and does not get into the hot press. In this case substantially more heat is required for the evaporation of moisture on the top surface of the mat than on the bottom surface of the mat. This heat can be supplied selectively to the mat by heating the metal mesh band circulating on top to a very high temperature.

The metal mesh belt may return through a separate heat tunnel from the entrance of the continuously operating press to a quarter of the press length, since the metal mesh belt should be heated to a higher temperature than the steel belt. The metal mesh belt is preferably drawn over a heating plate. Instead of the heating plate, heated rolls can also be used. Between the heating plate of the preheating section and the steel belt, thermal insulation should be provided, which preferably should be carried even around the entrance drum. From the first quarter to the end of the press the metal mesh belt is carried in the same insulating tunnel as the roll rods and the steel belt.

In another embodiment, the metal mesh belt can be brought to a temperature that is about 80°K higher than that of the steel belt in the entrance (about 120° C.). After making contact with the raw material mat the metal mesh belt will shrink, but this shrinkage is prevented by the steel belt. This shrinkage signifies a stretching of the metal mesh belt, but in the hot pressing operation it is still in the elastic range. After the pressure is relieved in the exit from the press the metal mesh band may shrink unhampered, since the press pressure in this area is no longer enough to harm the materials in contact with one another.

It is also appropriate to use a metal mesh belt in which the warp is made of stainless steel and the filling of cast steel. This makes it possible to obtain a metal mesh belt that has an elastic elongation of 1% lengthwise, which is useful in regulating the running of the belt and in compensating for irregularities.

In the use of the material of the metal mesh belt proposed according to the invention it is also important to consider that the metal mesh belt must be so elastic that, at the pressure acting upon it, it can greatly compensate the stresses exerted upon it. A shorter pressing time or a shorter continuously operating press can advantageously also be achieved if the spreading of the mat takes place with a moisture content of less than or equal to approximately 9 weight percent, and then water is sprayed on one or both faces or the mat as a whole, or only the faces are preheated with steam.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and as a practical application to enable one skilled in the art to utilize the invention in various embodiments and with various modifications suited to the particular use contemplated. It is intended that the scope of the invention be defined by the claims appended hereto and their equivalents.

| List of reference numbers: |
|---|
| 1. Continuously operating press |
| 2. Bottom frame part |
| 3. Upper frame part |
| 4. Steel belt, below |
| 5. Steel belt, above |
| 6. Press platen, below |
| 7. Press platen, above |
| 8. Driving drum |
| 9. Idler drum |
| 10. Mat of material to be pressed |
| 11. Press gap |
| 12. Spreading station |
| 13. Conveyor belt |
| 14. Guide pulleys |
| 15. Metal mesh belt |
| 16. Isolating tunnel |
| 17. Guide pulleys |
| 18. Heating tunnel |
| 19. Wood material board |
| 20. Heating roll |
| 21. Heating plates |
| 22. Preheating system |
| 23. Spraying system |

What is claimed is:

1. A method for the continuous manufacture of wood material boards having a textured surface on at least one side, comprising the steps of:

forming a mat of a wood or lignocellulose-containing material, treated with a binding agent, onto a continuously moving conveyor belt;

introducing the mat between steel belts each circulating around one of an upper and lower frame part of a continuously operating press; and after the step of introducing the mat, curing the mat in the continuously operating press to form one of a strand of boards and an endless wood material board by applying pressure and heat to the mat, wherein the continuously operating press comprises at least one endless metal mesh belt configured to circulate with a corresponding one of said steel belts, wherein the metal mesh belt comprises a material having a thermal conductivity considerably higher than that of the corresponding steel belt and having a thermal expansion coefficient approximately equal to that of the corresponding steel belt, wherein the metal mesh belt and the corresponding steel belt are configured to pass through an insulating tunnel, in a return run, to reduce heat loss by thermal radiation, wherein the metal mesh belt is configured to pass through a heating tunnel, which is separated from the corresponding steel belt, wherein the heating tunnel is configured to heat the metal mesh belt to a temperature that is higher than a temperature of the corresponding steel belt by at least 40° C., and wherein curing the mat comprises applying a specific pressure to the mat of at least 0.3 N/mm2 during a first at least 80% of a pressing time.

2. The method according to claim 1, further comprising the step of:

measuring a density profile of the formed one of the strand of boards and the endless wood material board, after the step of curing the mat, wherein the heating tunnel is configured to heat the metal mesh belt to a temperature profile that directly depends on said density profile.

3. The method according to claim 1, further comprising the step of:

adjusting a symmetrical or asymmetrical raw density profile in the formed one of the strand of boards and the endless wood material board, by adjusting a heat input into the side of the mat which is to be textured.

4. The method according to claim 1, wherein the heating tunnel is configured to heat the metal mesh belt to a temperature that is higher than said temperature of the corresponding steel belt by at least 80° C.

5. The method according to claim 1, wherein said step of introducing the mat comprises:

introducing the mat with a moisture content of less than or equal to approximately 9 weight-percent.

6. The method according to claim 1, further comprising the step of:

spraying one or both face strata of the mat with water.

7. The method according to claim 1, further comprising the step of:

preheating one or both face strata of the mat with steam.

8. The method according to claim 1, wherein the metal mesh belt comprises at least two materials.

9. The method according to claim 1, further comprising the step of:

cleaning the metal mesh belt.

10. The method according to claim 1, wherein the thermal conductivity of the metal mesh belt is at least 70% greater than the thermal conductivity of the steel belt.

11. The method according to claim 1, wherein the insulating tunnel is arranged outside of an area formed between the upper and lower frame parts of the continuously operating press.

12. The method according to claim 1, further comprising the step of preheating the mat in a preheating device located upstream of the continuously operating press.

13. The method according to claim 1, wherein the metal mesh belt passes between the upper and lower frame parts of the continuously operating press.

14. The method according to claim 1, wherein the mat and the metal mesh belt are pressed by the continuously operating press, wherein the metal mesh belt texturizes a surface of the mat.

15. The method according to claim 8, wherein the metal mesh belt comprises cast steel and stainless steel.

16. A method for the continuous manufacture of wood material boards having a textured surface on at least one side, comprising the steps of:

forming a mat of a wood or lignocellulose-containing material, treated with a binding agent, onto a continuously moving conveyor belt;

introducing the mat between steel belts each circulating around one of an upper and lower frame part of a continuously operating press; and curing the mat in the continuously operating press to form one of a strand of boards and an endless wood material board by applying pressure and heat to the mat, wherein the metal mesh belt and the corresponding steel belt are configured to pass simultaneously through an insulating tunnel, in a return run, to reduce heat loss by thermal radiation, and wherein the metal mesh belt comprises a material having a thermal conductivity considerably higher than that of the corresponding steel belt.

17. The method according to claim 16, wherein the material of the metal mesh belt has a thermal expansion coefficient approximately equal to that of the corresponding steel belt.

18. The method according to claim 16, wherein the metal mesh belt is configured to pass through a heating tunnel, which is separated from the corresponding steel belt.

19. The method according to claim 18, wherein the heating tunnel is configured to heat the metal mesh belt to a temperature that is higher than a temperature of the corresponding steel belt by at least 40° C.

20. The method according to claim 19, wherein the heating tunnel is configured to heat the metal mesh belt to a temperature that is higher than said temperature of the corresponding steel belt by at least 80° C.

21. The method according to claim 18, further comprising the step of:

measuring a density profile of the formed one of the strand of boards and the endless wood material board.

22. The method according to claim 21, wherein the heating tunnel is configured to heat the metal mesh belt to a temperature profile that directly depends on said density profile.

23. The method according to claim 16, wherein the step of curing the mat comprises:

applying a specific pressure to the mat of at least 0.3 N/mm2 during a first at least 80% of a pressing time.

24. The method according to claim 16, further comprising the step of:

adjusting a symmetrical or asymmetrical raw density profile in the formed one of the strand of boards and the endless wood material board, by adjusting a heat input into the side of the mat which is to be textured.

25. The method according to claim 16, wherein said step of introducing the mat comprises:

introducing the mat with a moisture content of less than or equal to approximately 9 weight-percent.

26. The method according to claim 16, wherein the metal mesh belt comprises at least two materials.

27. The method according to claim 16, further comprising the step of:

cleaning the metal mesh belt.

28. The method according to claim 16, wherein the thermal conductivity of the metal mesh belt is at least 70% greater than the thermal conductivity of the steel belt.

29. The method according to claim 16, wherein the metal mesh belt is configured to pass over a heating roll.

30. The method according to claim 16, wherein the insulating tunnel is arranged outside of an area formed between the upper and lower frame parts of the continuously operating press.

31. The method according to claim 16, wherein the metal mesh belt passes between the upper and lower frame parts of the continuously operating press.

32. The method according to claim 16, wherein the mat and the metal mesh belt are pressed by the continuously operating press, wherein the metal mesh belt texturizes a surface of the mat.

33. The method according to claim 18, further comprising the step of preheating the mat in a preheating device located upstream of the continuously operating press.

34. The method according to claim 26, wherein the metal mesh belt comprises cast steel and stainless steel.

35. A method for the continuous manufacture of wood material boards having a textured surface on at least one side, comprising the steps of:

forming a mat of a wood or lignocellulose-containing material, treated with a binding agent, onto a continuously moving conveyor belt;

introducing the mat between steel belts each circulating around one of an upper and lower frame part of a continuously operating press; and curing the mat in the continuously operating press to form one of a strand of boards and an endless wood material board by applying pressure and heat to the mat, wherein the continuously operating press comprises at least one endless metal mesh belt configured to circulate with a corresponding one of said steel belts and to travel with the mat, wherein the metal mesh belt comprises a material having a thermal conductivity considerably higher than that of the corresponding steel belt, wherein the metal mesh belt has a thermal expansion coefficient within the range of steel, and wherein the metal mesh belt texturizes a surface of the mat.

36. The method according to claim 35, wherein the thermal expansion coefficient of the metal mesh belt is within 5×10−6/° C. of 16×10−6/° C.

37. The method according to claim 35, wherein the metal mesh belt and the corresponding steel belt are configured to pass through an insulating tunnel, in a return run, to reduce heat loss by thermal radiation.

38. The method according to claim 35, wherein the metal mesh belt is configured to pass through a heating tunnel, which is separated from the corresponding steel belt.

39. The method according to claim 38, wherein the heating tunnel is configured to heat the metal mesh belt to a temperature that is higher than a temperature of the corresponding steel belt by at least 40° C.

40. The method according to claim 39, wherein the heating tunnel is configured to heat the metal mesh belt to a temperature that is higher than said temperature of the corresponding steel belt by at least 80° C.

41. The method according to claim 38, further comprising the step of:

measuring a density profile of the formed one of the strand of boards and the endless wood material board.

42. The method according to claim 41, wherein the heating tunnel is configured to heat the metal mesh belt to a temperature profile that directly depends on said density profile.

43. The method according to claim 35, wherein the step of curing the mat comprises:

applying a specific pressure to the mat of at least 0.3 N/mm2 during a first at least 80% of a pressing time.

44. The method according to claim 35, further comprising the step of:

adjusting a symmetrical or asymmetrical raw density profile in the formed one of the strand of boards and the endless wood material board, by adjusting a heat input into the side of the mat which is to be textured.

45. The method according to claim 35, wherein said step of introducing the mat comprises:

introducing the mat with a moisture content of less than or equal to approximately 9 weight-percent.

46. The method according to claim 35, wherein the metal mesh belt comprises at least two materials.

47. The method according to claim 35, further comprising the step of:

cleaning the metal mesh belt.

48. The method according to claim 35, wherein the thermal conductivity of the metal mesh belt is at least 70% greater than the thermal conductivity of the steel belt.

49. The method according to claim 46, wherein the metal mesh belt comprises cast steel and stainless steel.

50. The method according to claim 37, wherein the insulating tunnel is arranged outside of an area formed between the upper and lower frame parts of the continuously operating press.

51. The method according to claim 38, further comprising the step of preheating the mat in a preheating device located upstream of the continuously operating press.

52. The method according to claim 35, wherein the metal mesh belt passes between the upper and lower frame parts of the continuously operating press.

* * * * *